United States Patent [19]
Russell et al.

[11] Patent Number: 5,440,475
[45] Date of Patent: Aug. 8, 1995

[54] ELECTRONIC BALLAST WITH LOW HARMONIC DISTORTION

[75] Inventors: Randy G. Russell, Glen Ellyn; Kent E. Crouse, Hanover Park, both of Ill.

[73] Assignee: Energy Savings, Inc., Schaumburg, Ill.

[21] Appl. No.: 148,295

[22] Filed: Nov. 8, 1993

[51] Int. Cl.$^6$ .................. H02M 1/12; H05B 37/02
[52] U.S. Cl. .................. 363/45; 315/209 R
[58] Field of Search ......... 323/222, 223, 265, 271, 323/276, 282; 363/34, 37, 44, 45, 46, 50; 361/79, 86, 91; 315/200 R, 203, 204, 207, 208, 209 R, 212, 221, 222, 224, 225, 247, DIG. 5, DIG. 7

[56] References Cited

U.S. PATENT DOCUMENTS

| | | | |
|---|---|---|---|
| 4,222,096 | 9/1980 | Capewell | 363/44 |
| 4,654,774 | 3/1987 | Lemmers | 363/48 |
| 4,862,041 | 8/1989 | Hirschmann | 315/DIG. 5 |
| 4,959,591 | 9/1990 | Hirschmann | 315/209 R |
| 5,115,347 | 5/1992 | Nilssen | 315/247 |
| 5,122,712 | 6/1992 | Hirschmann | 315/DIG. 5 |
| 5,214,356 | 5/1993 | Nilssen | 315/224 |
| 5,311,102 | 5/1994 | Du | 315/209 R |

*Primary Examiner*—Thomas M. Dougherty
*Assistant Examiner*—Matthew V. Nguyen
*Attorney, Agent, or Firm*—Cahill, Sutton & Thomas

[57] ABSTRACT

Power factor is increased and harmonic distortion is decreased in a boost circuit by varying the current drawn in phase with the ripple voltage from a rectifying bridge. The boost circuit includes a series connected inductor and switching transistor and the control electrode of the switching transistor is connected to a second inductor. The second inductor is magnetically coupled to the first inductor and provides feedback for sustaining high frequency oscillations in the boost circuit. A third inductor is magnetically coupled to the first and second inductors and to the control electrode of the switching transistor. The voltage from the third inductor is rectified and filtered to remove the high frequency pulses but not the ripple and the voltage is coupled to the control electrode of the switching transistor for changing the power consumed by said boost circuit in phase with the ripple.

10 Claims, 3 Drawing Sheets

ELECTRONIC BALLAST WITH LOW HARMONIC DISTORTION

BACKGROUND OF THE INVENTION

This invention relates to electronic ballasts for gas discharge lamps and, in particular, to a low cost electronic ballast having high power factor and low harmonic distortion.

A gas discharge lamp, such as a fluorescent lamp, is a non-linear load to a power line, i.e. the current through the lamp is not directly proportional to the voltage across the lamp. Current through the lamp is zero until a minimum voltage is reached, then the lamp begins to conduct. Once the lamp conducts, the current will increase rapidly unless there is a ballast in series with the lamp to limit current.

A resistor can be used as a ballast but a resistor consumes power, thereby decreasing efficiency, measured in lumens per watt. An inductor in series with the lamp is a better ballast than a resistor in terms of efficiency but is worse in terms of power factor. Power factor is a term used in connection with load devices powered by alternating current (AC) to indicate whether or not the load is a pure resistance (power factor of 1.0). If a load has a power factor less than 1.0, the current and voltage in the circuit are out of phase, causing increased power consumption. Regulations in many states require a high minimum power factor, e.g. 0.85, as part of energy conservation measures and the effect of these regulations is to require the use of electronic ballasts.

An electronic ballast typically includes a converter for changing the AC from a power line to direct current (DC) and an inverter for changing the DC to high frequency AC. Converting from AC to DC is usually done with a full wave or bridge rectifier. A filter capacitor on the output of the rectifier stores energy for powering the inverter. The voltage on the capacitor is not constant but has a 120 hz "ripple" that is more or less pronounced depending on the size of the capacitor and the amount of current drawn from the converter. Some ballasts include a "boost" circuit to increase the voltage on the capacitor from approximately 140 volts to 300 volts or higher. The inverter changes the DC to high frequency AC at 140-300 volts for powering one or more discharge lamps.

Electronic ballasts do not inherently have a high power factor. On the contrary, most electronic ballasts draw more current at low input voltage than at higher input voltage, just the opposite of a resistive load. A number of techniques have been proposed in the prior art for improving the power factor of electronic ballasts. One technique is to vary the power from the inverter to the lamp in phase with the ripple voltage. Another technique is to feed power from the inverter back to the converter to reduce current drain during low voltage portions of the input voltage. These techniques can improve power factor but do not improve harmonic distortion.

Harmonic distortion is a characteristic AC signals and relates to the harmonic content of a signal. As originally shown by the French mathematician Fourier, a square wave of a given frequency can be approximated by combining the fundamental and odd harmonics of a sinusoidal wave having the same frequency as the square wave. The waveform of the AC signal in a power line is sinusoidal and has a frequency of 60 hz. in the U.S.A. If the current drawn by a ballast is essentially in the form of square wave pulses, then the ballast is said to exhibit harmonic distortion because of the odd harmonics of 60 hz. in the current through the ballast.

One can improve the power factor of a ballast and still exhibit a large harmonic distortion. For example, a 60 hz. square wave signal can appear to have a power factor as high as 0.95. However, harmonic distortion is 30% or more. Harmonic distortion is a problem for the three-phase circuits typically found in commercial buildings because odd harmonics do not cancel out on the neutral line of a three phase system. Since the odd harmonics do not cancel out, power consumption is increased.

Electronic ballasts are intended to be connected to a load. If a lamp is not connected to the inverter or if a lamp is defective, the voltage on the connectors for the lamp can become even higher than the 300 volts available from the converter. This creates a hazardous situation for anyone who may come in contact with the ballast. Most ballasts have sensing circuitry for detecting a missing or defective lamp and for shutting off the inverter for a predetermined period of time. There is a problem in that the converter is still operating, producing in excess of 300 volts within the ballast.

In view of the foregoing, it is therefore an object of the invention to provide a low cost electronic ballast having increased power factor and reduced harmonic distortion.

Another object of the invention is to improve the power factor and harmonic distortion of an electronic ballast by varying the current drain of a boost circuit in accordance with the ripple voltage.

A further object of the invention to provide an electronic ballast in which both the converter and the inverter are shut off when a lamp is missing or defective.

SUMMARY OF THE INVENTION

The foregoing objects are achieved in the invention in which an electronic ballast includes a self-oscillating boost circuit for converting rectified DC having a large ripple into a high voltage DC. The boost circuit includes a series connected inductor and switching transistor. A control electrode of the switching transistor is connected to a second inductor which is magnetically coupled to the first inductor for sustaining high frequency oscillations in the boost circuit. A third inductor is magnetically coupled to the first and second inductors and is electrically coupled to a ripple detector. The ripple detector includes a rectifier and a filter for removing the high frequency oscillations, but not the ripple, from the voltage from the third inductor. The output of the ripple detector is coupled to the control electrode of the switching transistor to reduce current during low input voltage to the boost circuit. In accordance with another aspect of the invention, means are provided for shutting off the boost circuit when a lamp is missing or defective.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
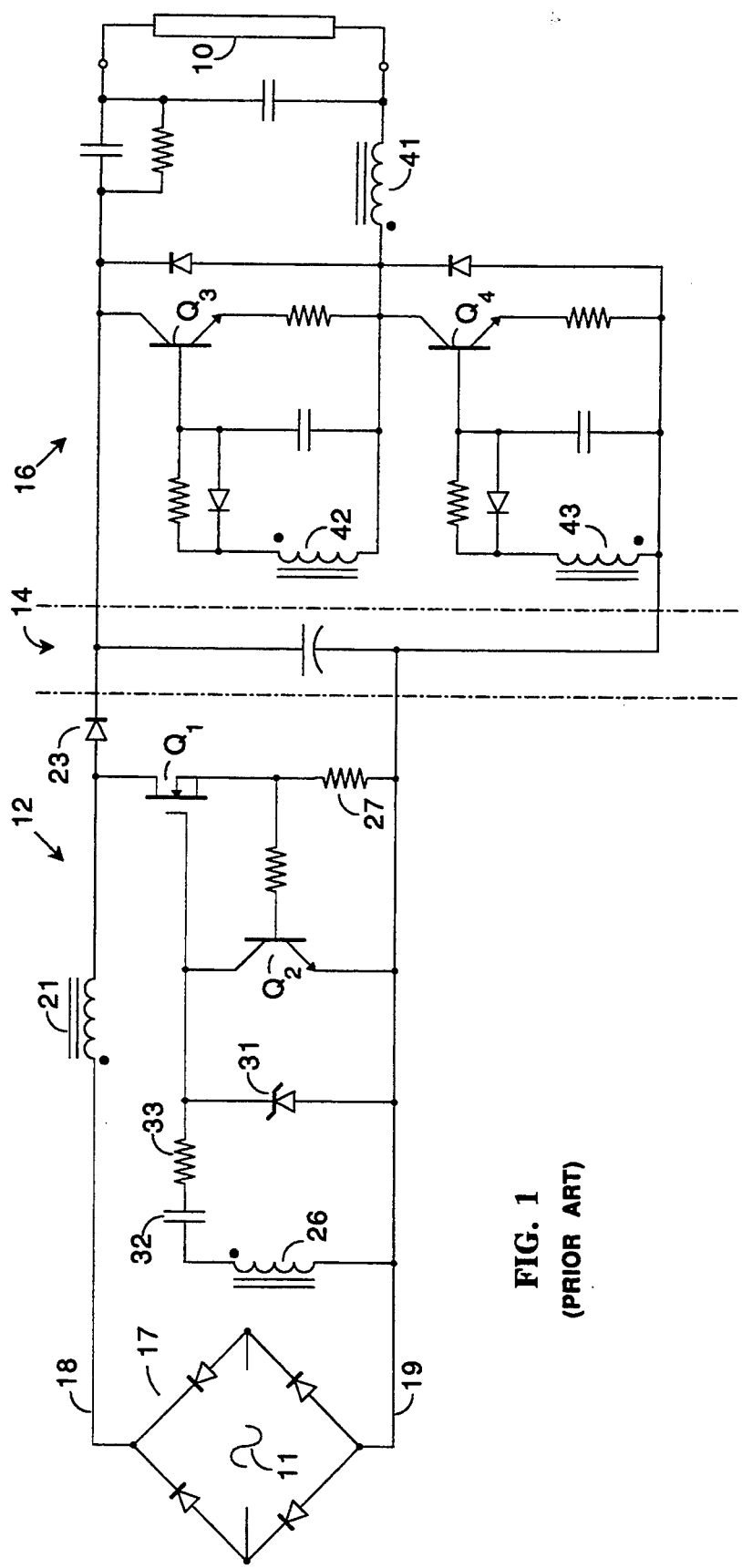
FIG. 1 is a schematic of an electronic ballast of the prior art.

FIG. 1 illustrates the major components of an electronic ballast for connecting fluorescent lamp 10 to an AC power line, represented by waveform 11. The electronic ballast in FIG. 1 includes converter 12, energy storage capacitor 14, and inverter 16. Converter 12 rectifies the alternating current from the AC power line and stores it on capacitor 14. Inverter 16 is powered by the energy stored in capacitor 14 and provides a high frequency, e.g. 30 khz, alternating current to lamp 10.

Converter 12 includes bridge rectifier 17 having DC output terminals connected to rails 18 and 19. If rectifier 17 were simply connected to capacitor 14, then the maximum voltage on capacitor 14 would be equal to approximately 1.4 times the rms value of the applied voltage. The voltage on capacitor 14 is increased to a higher voltage by a boost circuit including inductor 21, transistor $Q_1$, and diode 23. When transistor $Q_1$ is conducting, current flows from rail 18 through inductor 21 and transistor $Q_1$ to rail 19. When transistor $Q_1$ stops conducting, the field in inductor 21 collapses and the inductor produces a high voltage which adds to the voltage from bridge rectifier 17 and is coupled through diode 23 to capacitor 14. Diode 23 prevents current from flowing back to transistor $Q_1$ from capacitor 14.

A pulse signal must be provided to the gate of transistor $Q_1$ in order to periodically turn $Q_1$ on and off to charge capacitor 14. Inductor 26 is magnetically coupled to inductor 21 and provides feedback to the gate of transistor $Q_1$, causing transistor $Q_1$ to oscillate at high frequency, i.e. a frequency at least ten times the frequency of the AC power line, e.g. 30 khz.

Resistor 27, in series with the source-drain path of transistor $Q_1$, provides a feedback voltage which is coupled to the base of transistor $Q_2$. When the voltage on resistor 27 reaches a predetermined magnitude, transistor $Q_2$ turns on, turning off transistor $Q_1$. Resistor 27 typically has a small value, e.g. 0.5 ohms. Zener diode 31 limits the voltage on the gate of transistor $Q_1$ from inductor 26 and capacitor 32 and resistor 33 provide pulse shaping for the signal to the gate of transistor $Q_1$ from inductor 26.

In inverter 16, transistors $Q_3$ and $Q_4$ are series connected between rails 18 and 19 and conduct alternately to provide a high frequency pulse train to lamp 10. Inductor 41 is series connected with lamp 10 and is magnetically coupled to inductors 42 and 43 for providing feedback to transistors $Q_3$ and $Q_4$ to alternately switch the transistors. The oscillating frequency of inverter 16 is independent of the frequency of converter 12 and is on the order of 25–50 khz.

Figure 2:
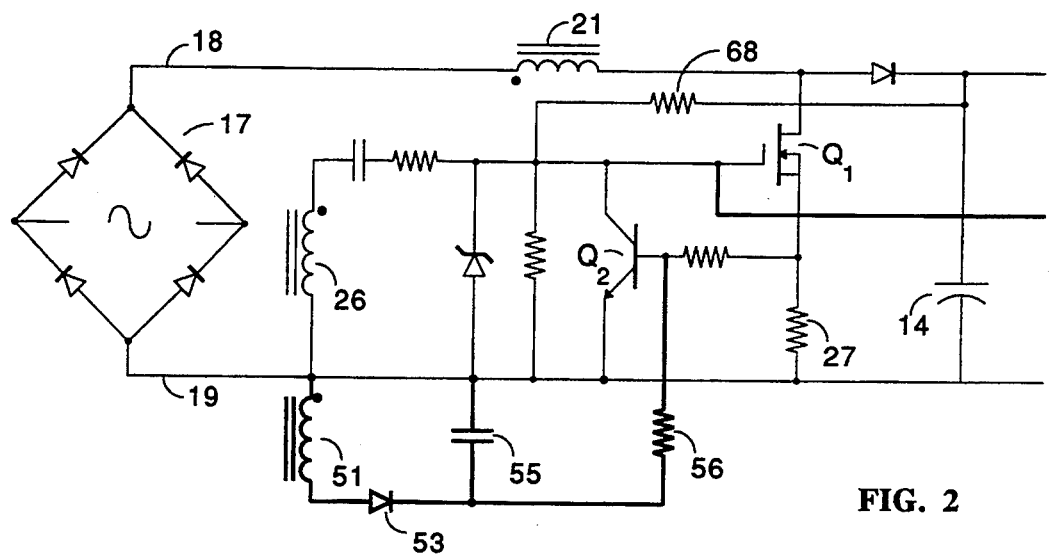
FIG. 2 is a schematic of a converter constructed in accordance with the invention.

FIG. 2 illustrates a converter constructed in accordance with a preferred embodiment of the invention in which the feedback to switching transistor $Q_1$ is modified to increase the peak current of $Q_1$ during periods of high voltage from the bridge rectifier and to reduce the peak current of $Q_1$ during periods of low voltage from the bridge rectifier. Specifically, inductor 51 is magnetically coupled to inductors 21 and 26. The voltage induced in inductor 51 therefore includes a high frequency component from the operation of transistor $Q_1$ and a low frequency component from the ripple voltage. The voltage from inductor 51 is coupled to a ripple detector including diode 53 and capacitor 55. The rectified voltage on capacitor 55 is coupled to the control electrode of transistor $Q_2$ by resistor 56.

Capacitor 55 and resistor 56 are an RC filter having a time constant on the order of the period of the ripple voltage from bridge rectifier 17. This is unlike circuits of the prior art wherein the time constant of the filter is much longer in order to filter out the ripple, i.e. the prior art provides DC feedback for controlling the current drawn by the boost circuit. Stated another way, inductor 51 provides low frequency feedback, i.e. feedback at the ripple frequency, for improving power factor.

During periods of high voltage from rectifier 17, a relatively lower voltage is produced on capacitor 55 which, in turn, decreases the conductivity of transistor $Q_2$ and increases the conductivity of transistor $Q_1$. During periods of low voltage, a higher voltage is coupled to the control electrode of transistor $Q_2$, increasing the conductivity of $Q_2$ and, in turn, reducing the conductivity of transistor $Q_1$.

Inductor 51 and the ripple detector significantly improve power factor and harmonic distortion. For example, a converter constructed in accordance with the invention exhibited a power factor of 0.996 and a total harmonic distortion (THD) of 5%. The same converter but without inductor 51 exhibited a power factor of 0.950 and a THD of 40%.

Figure 3:
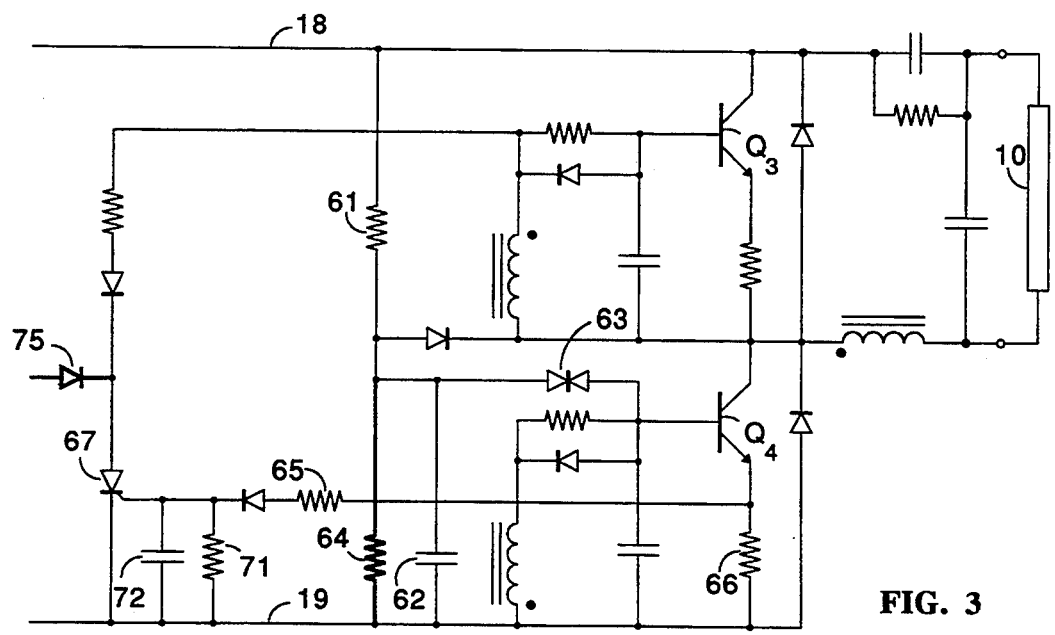
FIG. 3 is a schematic of an inverter constructed in accordance with the invention.

FIG. 3 illustrates an inverter constructed in accordance with the invention. The inverter of FIG. 3 is very similar to the inverter of FIG. 1 with some additionally circuitry for starting the inverter. Resistor 61 and capacitor 62 combine to provide a voltage to diac 63 for initiating oscillations of the inverter. In accordance with the invention, resistor 64 is added to prevent starting until rails 18 and 19 reaches a high voltage.

Resistor 65 samples the voltage from resistor 66 in series with the emitter of transistor $Q_4$ and couples the voltage to the gate electrode of SCR 67. SCR 67 cuts off the oscillations of the inverter and the converter if a lamp is not present or if a lamp is defective and does not conduct after a predetermined number of cycles of oscillation by the inverter. The number of oscillations is determined by the time constant of an RC network including resistor 71 and capacitor 72. The time constant of the RC network is such that starting is terminated after five to ten cycles of the inverter frequency.

The length of time that the inverter is off is determined by the holding current of the SCR and the resistance in series with SCR 67, e.g. about one second. Resistor 68 (FIG. 2) is in series with SCR 67 between rails 18 and 19 and has a resistance of about one megohm.

In accordance with the invention, diode 75 interconnects the inverter with the converter, specifically with the gate of transistor $Q_1$. If SCR 67 conducts, the cathode of diode 75 is coupled to rail 19. Since diode 75 is conducting, the control electrode of $Q_1$ (FIG. 2) is held at approximately the potential of rail 19 and the boost circuit stops oscillating. Thus, diode 75 shuts off the boost circuit when a lamp is missing or when a lamp does not conduct after a predetermined number of cycles, thereby reducing shock hazard.

Figure 4:
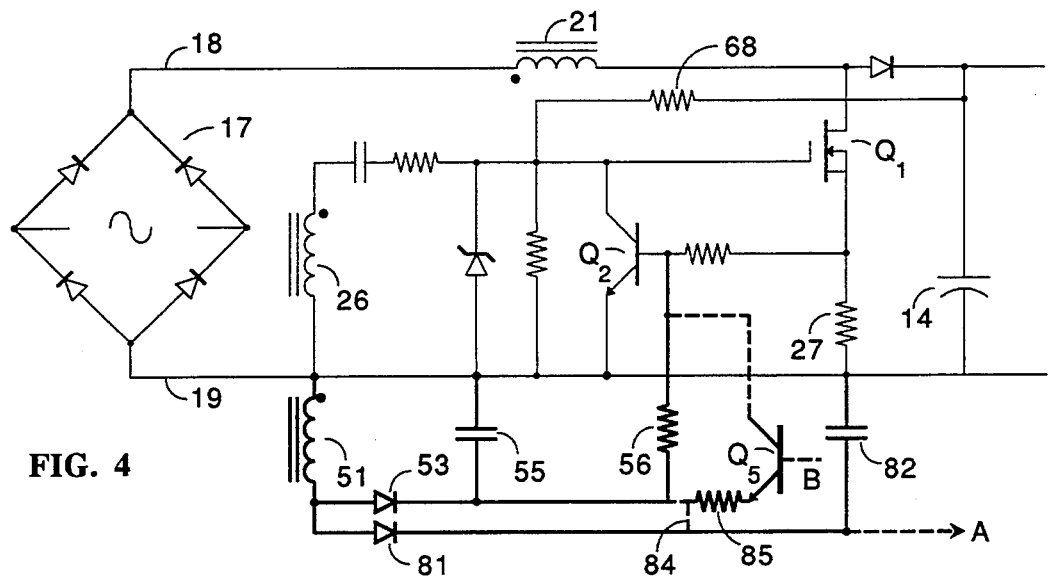
FIG. 4 is a schematic of a converter constructed in accordance with an alternative embodiment of the invention.

FIG. 4 illustrates an alternative embodiment of a converter constructed in accordance with the invention. Inductor 51 produces a voltage for powering integrated circuits implementing the invention, e.g. for a driven ballast in which transistors $Q_3$ and $Q_4$ are driven by a separate timing circuit. The voltage from inductor 51 is rectified by diode 81 and stored on capacitor 82. An output for powering timer IC's or other devices is represented by terminal A.

FIG. 4 also illustrates two ways in which the converter can be shut off in response to a signal on input line B. Transistor $Q_5$ has its collector connected to the base of $Q_2$ and its emitter connected through resistor 85 to diode 53. When a signal is applied to input line B, forward-biasing the base-emitter junction of transistor $Q_5$, transistor $Q_5$ conducts, connecting resistor 85 in parallel with resistor 56. This substantially changes the bias on the base of transistor $Q_2$, increasing conduction through transistor $Q_2$ and decreasing conduction through transistor $Q_1$. Thus, transistor $Q_5$ provides protection against overvoltage by keeping the voltage on rails 18 and 19 at a safe level during periods of light load, such as during preheating of the filaments in lamp 10.

Alternatively, as indicated by connection 84, transistor $Q_5$ can be connected to capacitor 82. Turning on transistor $Q_5$ has the same effect as before, changing the bias on $Q_1$ to regulate the rail voltage at a safe level.

Figure 5:
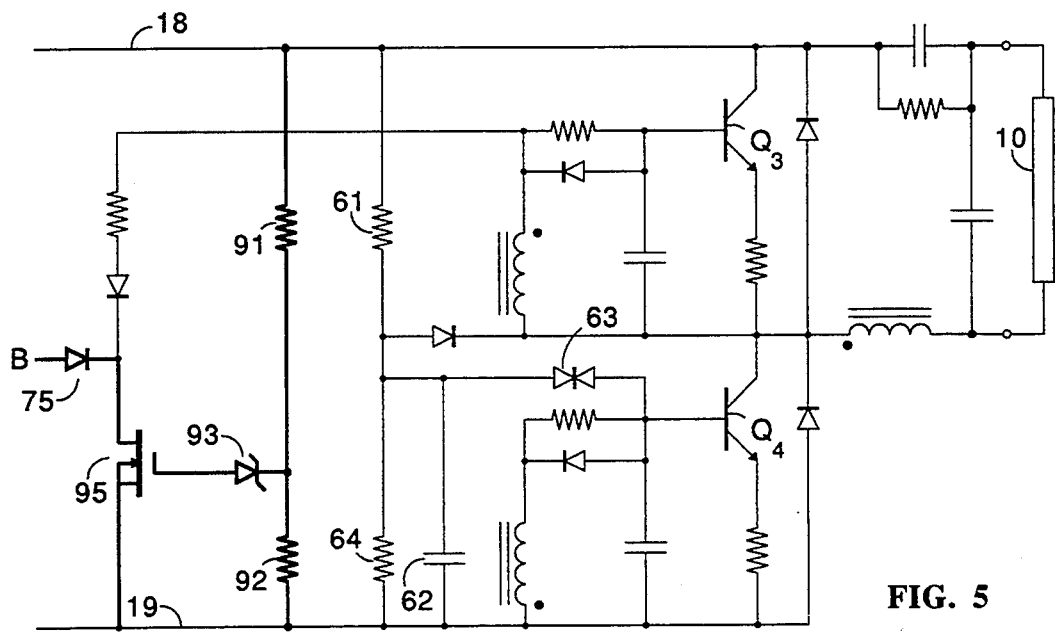
FIG. 5 is a schematic of an inverter constructed in accordance with an alternative embodiment of the invention.

FIG. 5 illustrates an alternative embodiment of the invention in which FET 95 in substituted for SCR 67 (FIG. 3). In this embodiment of the invention, rail voltage is sensed by a voltage divider including resistor 91 and resistor 92. Zener diode 93 connects the junction of these resistors to the gate of FET 95. If the voltage across rails 18 and 19 exceeds a predetermined value, zener diode 93 conducts, causing FET 95 to conduct. Diode 75, which can be connected to input line B (FIG. 4) or to the base of transistor $Q_1$ (FIG. 2), is forward-biased when FET 95 is conducting. Thus, a signal is produced on output line B in FIG. 5 for either shutting off a converter or for reducing the output voltage from a converter.

By substituting FET 95 for SCR 67, one obtains the advantage of overvoltage protection without causing the invertor to be latched off through the SCR. Alternatively, SCR 67 can be connected to zener diode 93 (FIG. 5) rather than as shown in FIG. 3.

The invention thus provides an improved, low cost electronic ballast in which power factor and harmonic distortion are improved by varying the current drain of a boost circuit in accordance with the ripple voltage from the bridge rectifier.

Having thus described several embodiments of the invention, it will be apparent to those of skill in the art that various modifications can be made within the scope of the invention. The polarity and type of semiconductor device used for implementing the invention can be different from that shown in the embodiments of FIGS. 2-5. For example, as previously noted, FET 95 is substituted for SCR 67. Transistor $Q_5$ can be an FET instead of a bipolar transistor.

We claim:

1. An electronic ballast for powering a gas discharge lamp from an AC power line, said ballast having low harmonic distortion and comprising:

a rectifier for converting alternating current from said power line into direct current having a ripple;

a boost circuit operating at a frequency at least one order of magnitude higher than the frequency of said AC power line, said boost circuit having an input connected to said rectifier and an output;

a capacitor coupled to the output of said boost circuit; and means coupled to said boost circuit for varying the switching frequency of said boost circuit in phase with said ripple.

2. The ballast as set forth in claim 1 wherein said boost circuit comprises:

a first inductor having a first terminal connected to said input and a second terminal;

a switching transistor and a resistor connected in series between said second terminal and electrical ground, wherein said second terminal is said output;

a second inductor magnetically coupled to said first inductor;

said switching transistor having a control electrode coupled to said second inductor for operating said switching transistor as a free-running oscillator;

a feedback transistor coupled to said control electrode and to said resistor for controlling the switching of said switching transistor; and wherein said means is magnetically coupled to said boost circuit.

3. The ballast as set forth in claim 2 wherein said feedback transistor includes a control electrode and said means comprises:

a third inductor magnetically coupled to said second inductor;

a second rectifier coupled to said third inductor;

an RC filter coupled between said second rectifier and the control electrode of said feedback transistor.

4. An electronic ballast for powering a gas discharge lamp from an AC power line, said ballast having high power factor and comprising:

a converter for converting alternating current from said power line into a high frequency direct current pulses having a low frequency ripple, said converter having an input for connection to said power line and an output;

a capacitor coupled to the output of said converter;

an inverter powered by the energy stored in said capacitor, said inverter having an input connected to said capacitor and an output for connection to said lamp; and means coupled to said converter for varying the current drawn by said converter and for varying said high frequency in phase with said ripple.

5. The ballast as set forth in claim 4 wherein said converter comprises:

a rectifier;

a first inductor having a first terminal connected to said rectifier and a second terminal, wherein said second terminal is the output of said converter;

a switching transistor and a resistor connected in series between said second terminal and electrical ground, wherein said switching transistor has a control electrode;

a second inductor magnetically coupled to said first inductor and electrically coupled to said control electrode for providing a feedback voltage to said control electrode; and said means includes a third inductor magnetically coupled to said first inductor and electrically coupled to said control electrode for providing a low frequency feedback voltage to said control electrode.

6. The ballast as set forth in claim 5 wherein said means also includes a second rectifier coupled to said third inductor and an RC filter coupled between said second rectifier and the control electrode of said feedback transistor, wherein the time constant of said RC filter is approximately equal to the period of said ripple.

7. An electronic ballast for powering a gas discharge lamp from an AC power line, said ballast having low harmonic distortion and comprising:
- a rectifier for converting alternating current from said power line into a DC voltage having a ripple;
- a capacitor for storing said DC voltage;
- a boost circuit coupled between said rectifier and said capacitor for increasing the magnitude of said DC voltage;
- an inverter coupled to said capacitor for changing said DC voltage into a high frequency AC voltage for said lamp;
- wherein said boost circuit includes a ripple detector for changing the power consumed by said boost circuit in accordance with said ripple.

8. The ballast as set forth in claim 7 wherein said boost circuit comprises:
- a first inductor having a first terminal connected to said rectifier and a second terminal, wherein said second terminal is the output of said boost circuit;
- a switching transistor and a resistor connected in series between said second terminal and electrical ground, wherein said switching transistor has a control electrode;
- a second inductor magnetically coupled to said first inductor and electrically coupled to said control electrode for providing a feedback voltage to said control electrode; and
- said ripple detector comprises:
- a third inductor magnetically coupled to said first inductor;
- a second rectifier connected to said third inductor;
- a low pass filter connected to said second rectifier, wherein said low pass filter has a time constant approximately the reciprocal of the frequency of said ripple and said low pass filter is coupled to said control electrode for providing a low frequency feedback voltage to said control electrode.

9. An electronic ballast for powering a gas discharge lamp from an AC power line, said ballast comprising:
- a converter for changing alternating current from said power line into a DC voltage having a ripple;
- a capacitor for storing said DC voltage;
- an inverter coupled to said capacitor for changing said DC voltage into a high frequency AC voltage for said lamp;
- wherein said inverter includes overvoltage protection circuitry for reducing said DC voltage and temporarily shutting off said converter during periods of excessively high voltage within said inverter.

10. The ballast as set forth in claim 9 wherein said converter comprises:
- a first inductor having a first terminal connected to said rectifier and a second terminal, wherein said second terminal is the output of said converter;
- a switching transistor and a resistor connected in series between said second terminal and electrical ground, wherein said switching transistor has a control electrode;
- a second inductor magnetically coupled to said first inductor and electrically coupled to said control electrode for providing a feedback voltage to said control electrode;
- a third inductor magnetically coupled to said first inductor;
- a second rectifier connected to said third inductor;
- a low pass filter connected to said second rectifier, wherein said low pass filter has a time constant approximately the reciprocal of the frequency of said ripple and said low pass filter is coupled to said control electrode for providing a low frequency feedback voltage to said control electrode.

* * * * *